(12) United States Patent
Ueda et al.

(10) Patent No.: US 7,351,500 B2
(45) Date of Patent: Apr. 1, 2008

(54) LITHIUM-CONTAINING COMPOSITE OXIDE AND NONAQUEOUS SECONDARY CELL USING THE SAME, AND METHOD FOR MANUFACTURING THE SAME

(75) Inventors: Atsushi Ueda, Hirakata (JP); Kazutaka Uchitomi, Settsu (JP); Shigeo Aoyama, Otsu (JP)

(73) Assignee: Hitachi Maxell, Ltd., Osaka (JP)

( * ) Notice: Subject to any disclaimer, the term of this patent is extended or adjusted under 35 U.S.C. 154(b) by 700 days.

(21) Appl. No.: 10/181,163

(22) PCT Filed: Nov. 14, 2001

(86) PCT No.: PCT/JP01/09967

§ 371 (c)(1),
(2), (4) Date: Jul. 16, 2002

(87) PCT Pub. No.: WO02/40404

PCT Pub. Date: May 23, 2002

(65) Prior Publication Data

US 2003/0082452 A1 May 1, 2003

(30) Foreign Application Priority Data

Nov. 16, 2000 (JP) ............................. 2000-350307
Sep. 18, 2001 (JP) ............................. 2001-282767

(51) Int. Cl.
*H01M 8/00* (2006.01)
(52) U.S. Cl. .................. 429/231.95; 429/218.1
(58) Field of Classification Search ............ 429/231.1, 429/223, 224, 231.3, 231.8, 218.1, 234, 231.95
See application file for complete search history.

(56) References Cited

U.S. PATENT DOCUMENTS

| 4,943,497 A | 7/1990 | Oishi et al. | |
| 5,256,504 A | * 10/1993 | Okuno et al. | ............... 429/332 |
| 5,429,890 A | * 7/1995 | Pynenburg et al. | ......... 429/310 |
| 5,707,756 A | 1/1998 | Inoue et al. | |
| 5,718,989 A | 2/1998 | Aoki et al. | |

(Continued)

FOREIGN PATENT DOCUMENTS

EP 1 443 575 A1 8/2004

(Continued)

OTHER PUBLICATIONS

Patent Abstracts of Japan, Publication No. 08037007 A; Feb. 6, 1996, 1 pg.

(Continued)

*Primary Examiner*—Patrick Joseph Ryan
*Assistant Examiner*—Monique Wills
(74) *Attorney, Agent, or Firm*—Osha Liang LLP

(57) ABSTRACT

Because of the composition represented by General Formula: $Li_{1+x+\alpha}Ni_{(1-x-y+\delta)/2}Mn_{(1-x-y-\delta)/2}M_yO_2$ (where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr, Fe, Co, Cu, Zn, Al, Ge and Sn), a high-density lithium-containing complex oxide with high stability of a layered crystal structure and excellent reversibility of charging/discharging can be provided, and a high-capacity non-aqueous secondary battery excellent in durability is realized by using such an oxide for a positive electrode.

35 Claims, 6 Drawing Sheets

U.S. PATENT DOCUMENTS

| | | | |
|---|---|---|---|
| 5,795,558 | A | 8/1998 | Aoki et al. |
| 6,040,090 | A | 3/2000 | Sunagawa et al. |
| 6,333,128 | B1 | 12/2001 | Sunagawa et al. |
| 6,368,750 | B1 | 4/2002 | Nemoto et al. |
| 6,964,828 | B2 * | 11/2005 | Lu et al. ............... 429/231.95 |
| 2003/0022063 | A1 | 1/2003 | Paulsen et al. |
| 2003/0170540 | A1 * | 9/2003 | Ohzuku et al. .......... 429/231.1 |

FOREIGN PATENT DOCUMENTS

| | | |
|---|---|---|
| JP | 03-049155 | 3/1991 |
| JP | 08037007 A | 2/1996 |
| JP | 10-294100 | 11/1998 |
| JP | 11-25957 | 1/1999 |
| JP | 11-219726 A | 8/1999 |
| JP | 11-250890 A | 9/1999 |
| JP | 11-273677 | 10/1999 |
| JP | 8-315860 A | 11/1999 |
| JP | 11-307094 | 11/1999 |
| JP | 11-354156 A | 12/1999 |
| JP | 2000-173666 | 6/2000 |
| JP | 2000-195516 | 7/2000 |
| JP | 2000-200607 | 7/2000 |
| JP | 2000-203947 | 7/2000 |
| JP | 2000-223122 | 8/2000 |
| JP | 2000-251894 | 9/2000 |
| JP | 2000-260432 | 9/2000 |
| KR | 2000-55128 | 9/2000 |

OTHER PUBLICATIONS

Patent Abstracts of Japan, publication No. 2000-223122, published Aug. 11, 2000.
Patent Abstracts of Japan, publication No. 2000-260432, published, Sep. 22, 2000.
Patent Abstracts of Japan, publication No. 2000-195516, published Jul. 14, 2000.
Patent Abstracts of Japan, publication No. 11-354156, published Dec. 24, 1999.
Patent Abstracts of Japan, publication No. 08-315860, published Nov. 29, 1996.
Patent Abstracts of Japan, publication No. 11-219726, published Aug. 10, 1999.
Patent Abstracts of Japan, publication No. 11-250890, published Sep. 17, 1999.
U.S. Office Action issued in U.S. Appl. No. 11/191,742 dated Jun. 30, 2006 (16 pages).
Lu et al. "Layered Li [$Ni_xCo_{1-2x}Mn_x$]$O_2$ Cathode Materials for Lithium-Ion Batteries", Electrochemical and Solid-State Letters, 4 (12) A200-A203 (2001).
Ohzuku et al. "Layered Lithium Insertion Material of $LiCO_{1/3}Ni_{1/3}Mn_{1/3}O_2$ for Lithium-Ion Batteries" Chemistry Letters, 642-643 (2001).
Patent Abstracts of Japan, Publication No. 11-273677 dated Oct. 8, 1999 (8 pages).
Yoshio, M et al. Journal of Power Sources, Aug. 2000, vol. 90, No. 2, 176-181.
Japanese Official Action dated Jun. 28, 2007 issued in JP Application No. 2002-542738 (2 pages).
Patent Abstracts of Japan; Publication No. 11-025957 dated Jan. 29, 1999 (2 pages).
Korean Office Action issued for Korean Application No. 10-2002-7009058 mailed on Apr. 30, 2005, 2 pages.
Partial English Translation of Korean Publication No. KR2000-55128 published on Sep. 5, 2000, 4 pages.
Partial European Search Report for European Application No. EP 01 98 2785 mailed on Sep. 14, 2005, 10 pages.
English Abstract of Japanese Publication No. 10294100, Publication Date: Nov. 4, 1998, 2 pages.
Japanese Office Action issued for Japanese Application No. 2002-542738 and mailed Apr. 13, 2006.
Patent Abstracts of Japan, Publication No. 03-049155 dated Mar. 1, 1991 (2 pages).
Abstract of Japanese Publication No. 2000-173666 dated Jun. 23, 2000 (1 page).
English Translation of Japanese Publication No. 2000-173666 dated Jun. 23, 2000 (24 pages).
English Translation of Japanese Office Action issued for Japanese Application No. 2002-542738 mailed Apr. 13, 2006.
English Translation of Japanese Publication No. 2000-223122 dated Aug. 11, 2000 (21 pages).
Patent Abstracts of Japan, Publication No. 11-354156 dated Dec. 24, 1999 (2 pages).
English Translation of Japanese Publication No. 11-354156 dated Dec. 24, 1999 (11 pages).
Patent Abstracts of Japan, Publication No. 11-307094, Publication Date: Nov. 5, 1999 and Full English Translation of JP11-307094, 37 pages.
Japanese Office Action issued for Japanese Application No. 2002-378538 and mailed Oct. 16, 2007 (3 pages).

* cited by examiner

LITHIUM-CONTAINING COMPOSITE OXIDE AND NONAQUEOUS SECONDARY CELL USING THE SAME, AND METHOD FOR MANUFACTURING THE SAME

TECHNICAL FIELD

The present invention relates to a lithium-containing complex oxide that can be used as a material for a positive electrode of a non-aqueous secondary battery, a non-aqueous secondary battery using the lithium-containing complex oxide, and a method for producing the lithium-containing complex oxide.

BACKGROUND ART

In recent years, along with the development of portable electronic equipment such as mobile phones and notebook computers, and the commercialization of electric automobiles, there is an increasing demand for a miniaturized and lightweight secondary battery with a high capacity. At present, as a secondary battery with a high capacity satisfying this demand, a non-aqueous secondary battery such as a lithium secondary battery using $LiCoO_2$ for a positive electrode and a carbon material for a negative electrode is being commercialized. Such a lithium secondary battery has a high energy density, and can be miniaturized and reduced in weight, so that it has been paid attention to as a power source of portable electronic equipment.

$LiCoO_2$ used as a material for a positive electrode of the lithium secondary battery is easy to produce and handle, so that it is often used as a preferable active material. However, $LiCoO_2$ is produced using cobalt, which is rare metal, as a material. Therefore, it is conceivable that a material shortage will become serious in the future. Furthermore, the price of cobalt itself is high and fluctuates greatly, so that it is desired to develop a material for a positive electrode that can be supplied stably at a low cost.

In view of the above, materials of a lithium-manganese oxide type are expected to be a prospective substitute for $LiCoO_2$ as a material for a positive electrode of a lithium secondary battery. Among them, lithium-manganese oxides with a Spinel structure, such as $Li_2Mn_4O_9$, $Li_4Mn_5O_{12}$, and $LiMn_2O_4$, are being investigated. In particular, $LiMn_2O_4$ can be charged/discharged in a potential range in the vicinity of 4 V against Li metal. The use of $LiMn_2O_4$ is disclosed in at least the following (JP 6(1994)-76824 A, JP 7(1995)-73883 A, JP 7(1995)-230802 A, JP 7(1995)-245106 A, etc.).

The theoretical discharge capacity of $LiCoO_2$ is 274 mAh/g. However, when deep charging/discharging is conducted, $LiCoO_2$ is changed in phase to influence a cycle life. Therefore, in an actual lithium secondary battery, the practical discharge capacity falls in a range of 125 to 140 mAh/g.

In contrast, the theoretical discharge capacity of $LiMn_2O_4$ is 148 mAh/g. However, $LiMn_2O_4$ also is changed in phase during charging/discharging in the same way as in $LiCoO_2$. Furthermore, in the case of using a carbon material as a negative active material, since the irreversible capacity of the carbon material is large, the discharge capacity that can be used in the case where $LiMn_2O_4$ is used actually for a battery is decreased to about 90 to 105 mAh/g. As is apparent from this, when $LiMn_2O_4$ is used as a positive active material, the battery capacity cannot be increased compared with the case where $LiCoO_2$ is used as a positive active material.

Furthermore, the true density of $LiCoO_2$ is 4.9 to 5.1 g/cm$^3$, whereas the true density of $LiMn_2O_4$ is very low (i.e., 4.0 to 4.2 g/cm$^3$). Therefore, considering the filling property as a positive active material, $LiMn_2O_4$ is more disadvantageous in terms of the capacity.

Furthermore, in a lithium secondary battery using $LiMn_2O_4$ as a positive active material, the structure of $LiMn_2O_4$ itself is unstable during charging/discharging. Therefore, there is a problem that the cycle characteristics of the $LiMn_2O_4$ type battery are worse than those of the $LiCoO_2$ type battery.

In order to solve the above-mentioned problem, it also is considered that a layered lithium-manganese oxide of $LiMnO_2$ or the like having a structure different from that of $LiMn_2O_4$ is used as a material for a positive electrode. However, as a result of the detailed study of this oxide by the inventors of the present invention, it was found that the properties such as the structure and characteristics are changed remarkably due to the composition of a compound, in particular, the presence of elements constituting the oxide other than Li and Mn, the kind thereof, and the ratio of quantity thereof, and the process in which the oxide is formed.

For example, in the case where the average valence of Mn approaches 3 due to the fluctuation of the composition of Spinel type lithium-manganese oxide ($LiMn_2O_4$), the crystal structure of the above-mentioned oxide is strained to cause a phase change from the Spinel structure of a cubic to a tetragonal, whereby $LiMnO_2$ is formed. The phase change from the cubic to the tetragonal occurs along with charging/discharging in a potential range in the vicinity of 3 V with respect to lithium. Therefore, the lithium secondary battery using the Spinel type lithium-manganese oxide ($LiMn_2O_4$) as a material for a positive electrode cannot be used in the same way as in the above-mentioned lithium secondary battery that is charged/discharged at a voltage in the vicinity of 4 V.

Furthermore, in the case where the structure molar ratio (Li/Mn) is 1, due to the Jahn-Teller effect of trivalent Mn, the crystal structure of $LiMnO_2$ exhibits an orthorhombic system.

This compound ($LiMnO_2$) can be charged/discharged electrochemically at a Li quantity ratio of 0 to 1.0, which results in a discharge capacity of about 285 mAh/g in terms of theory. However, as the ratio of tetravalent Mn is increased during initial charging, a phase transition to a Spinel structure occurs. Therefore, the initial charge/discharge curve and the second and subsequent charge/discharge curves exhibit different shapes. In addition, the discharge capacity in the case where discharging is terminated at a voltage of 3.5 V or more is decreased remarkably from a theoretical value. Furthermore, the structure is changed with the movement of Mn during charging/discharging. Therefore, cycle durability is insufficient, and rapid charging/discharging cannot be conducted.

Therefore, in order to commercialize a layered lithium-manganese oxide such as $LiMnO_2$, it is required to solve the problems involved in stabilization of a crystal structure, an increase in capacity due to the enhancement of reversibility of charging/discharging, and durability during a charge/discharge cycle.

DISCLOSURE OF INVENTION

The present invention, in one aspect, provides a lithium-containing complex oxide that has a stable structure, is excellent in reversibility of charging/discharging and durability during a charge/discharge cycle, and has a high energy density per volume, and to provide a non-aqueous secondary battery using the lithium-containing complex oxide for a positive electrode, which is excellent in durability such as cycle characteristics.

More specifically, a lithium-containing complex oxide of the present invention includes a composition represented by General Formula:

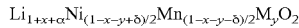

(where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr, Fe, Co, Cu, Zn, Al, Ge and Sn).

Furthermore, a method for producing a lithium-containing complex oxide having a composition represented by General Formula:

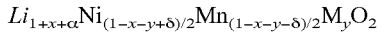

(where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr, Fe, Co, Cu, Zn, Al, Ge and Sn) is characterized by sintering a complex compound containing at least Ni and Mn as constituent elements and a Li compound.

Furthermore, a non-aqueous secondary battery of the present invention includes a positive electrode made of a positive active material, a negative electrode made of a negative active material, and a non-aqueous electrolyte, wherein the positive active material is a lithium-containing complex oxide having a composition represented by General Formula:

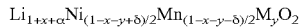

(where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr, Fe, Co, Cu, Zn, Al, Ge and Sn).

BEST MODE FOR CARRYING OUT THE INVENTION

Figure 1:
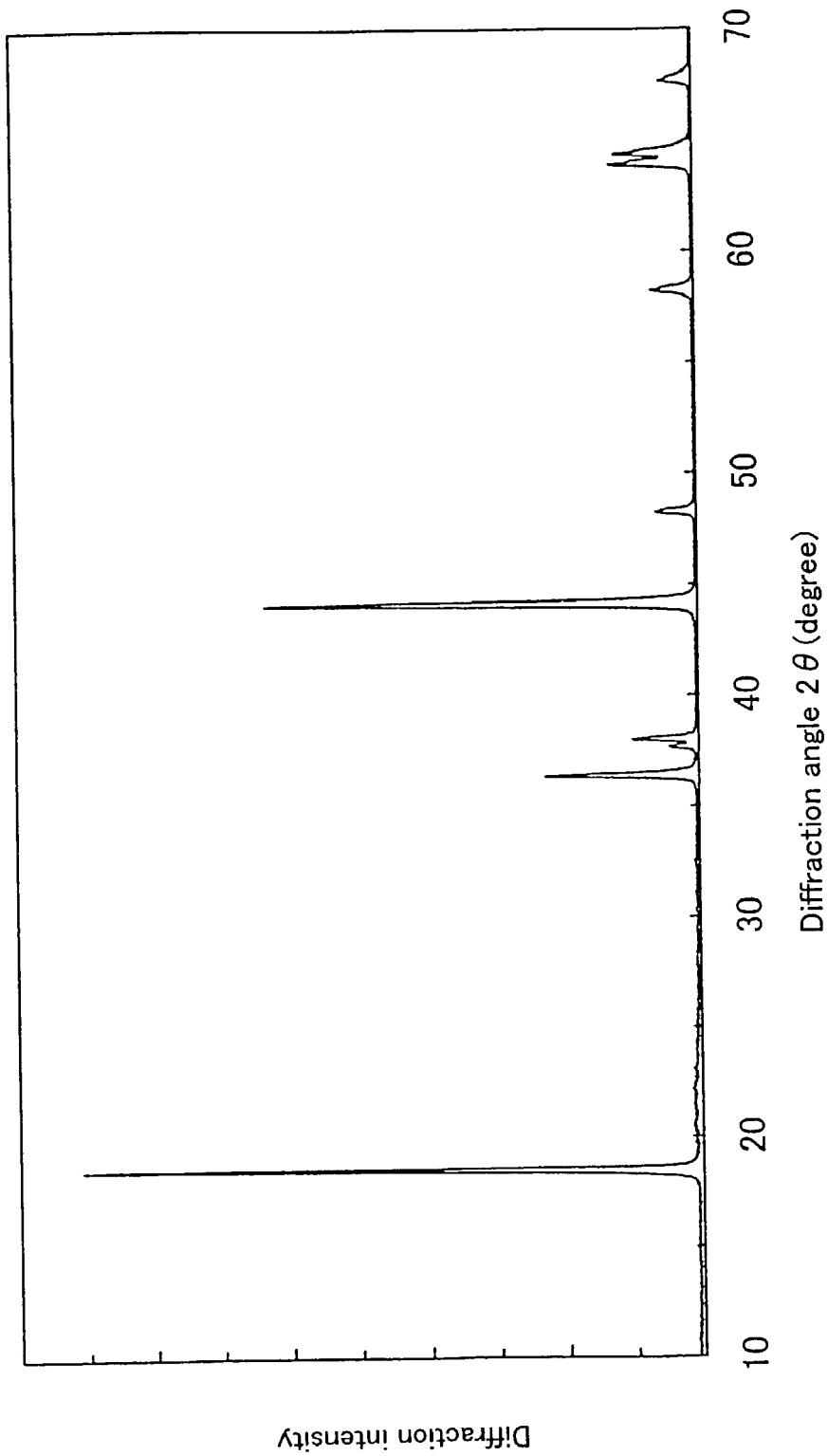
FIG. 1 is a view showing an X-ray diffraction pattern of a lithium-containing complex oxide synthesized in Example 1 according to the present invention.
Figure 2:
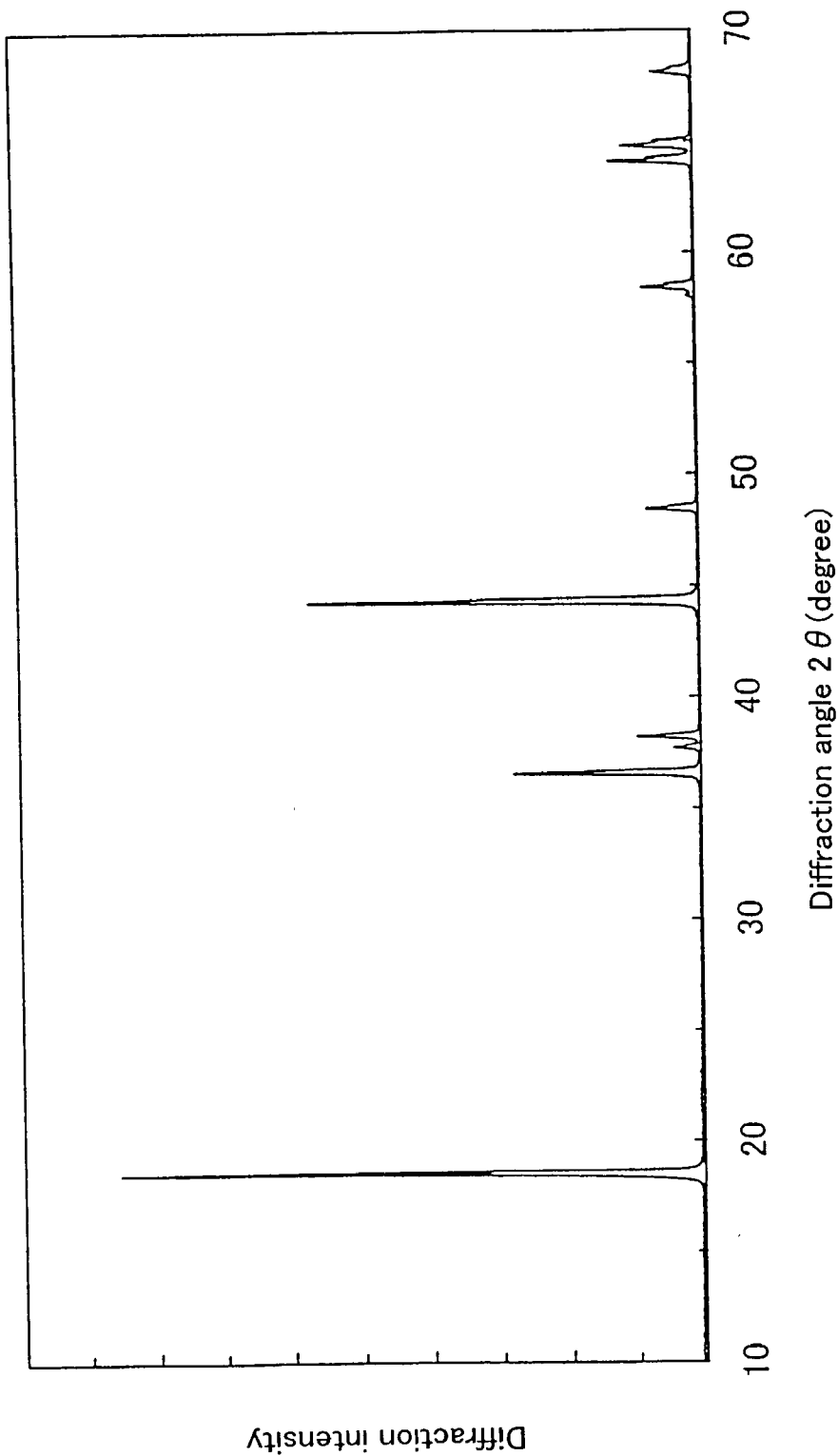
FIG. 2 is a view showing an X-ray diffraction pattern of a lithium-containing complex oxide synthesized in Example 8 according to the present invention.
Figure 3:
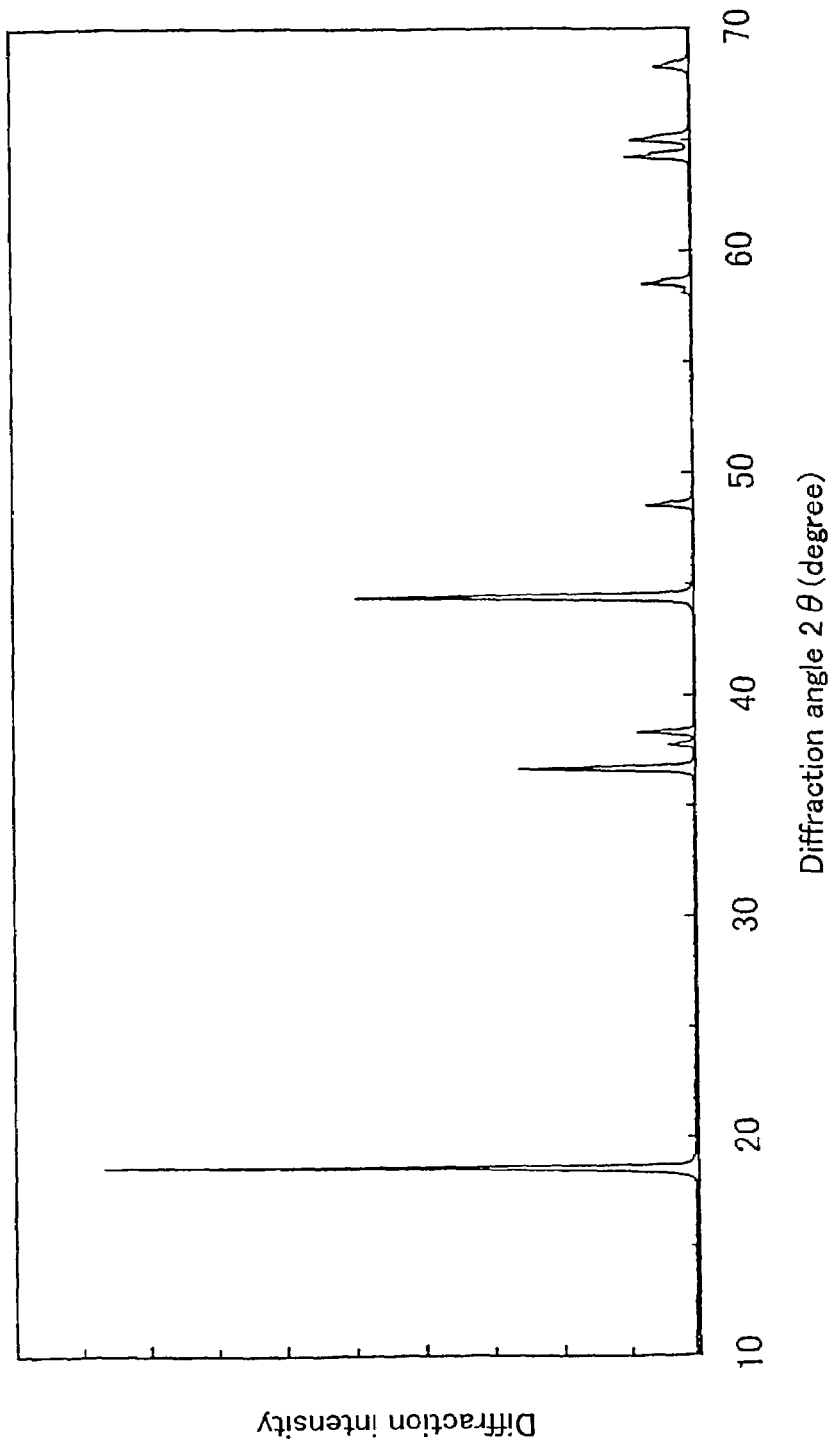
FIG. 3 is a view showing an X-ray diffraction pattern of a lithium-containing complex oxide synthesized in Example 9 according to the present invention.
Figure 4:
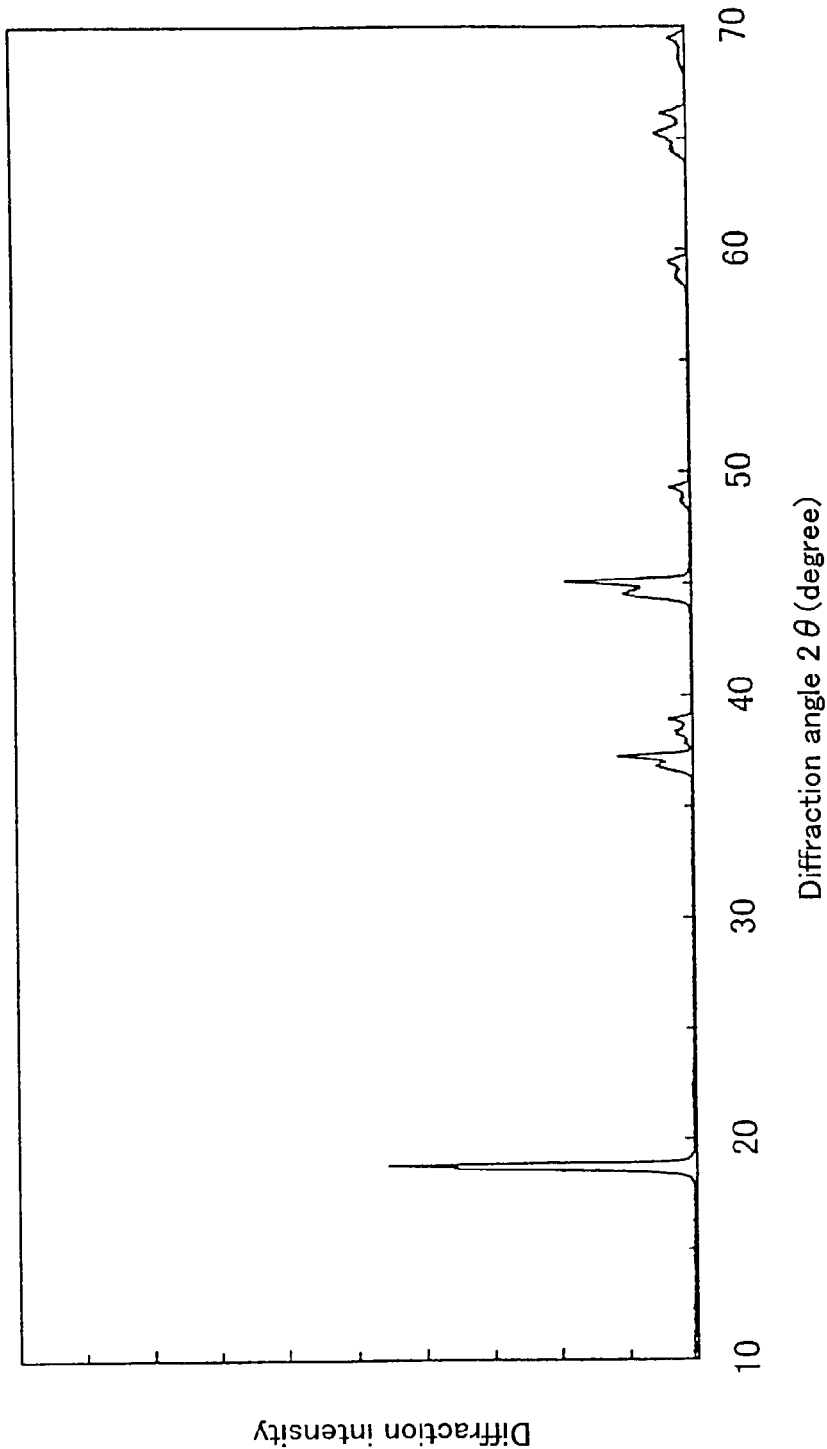
FIG. 4 is a view showing an X-ray diffraction pattern of a lithium-containing complex oxide synthesized in Comparative Example 4 according to the present invention.
Figure 5:
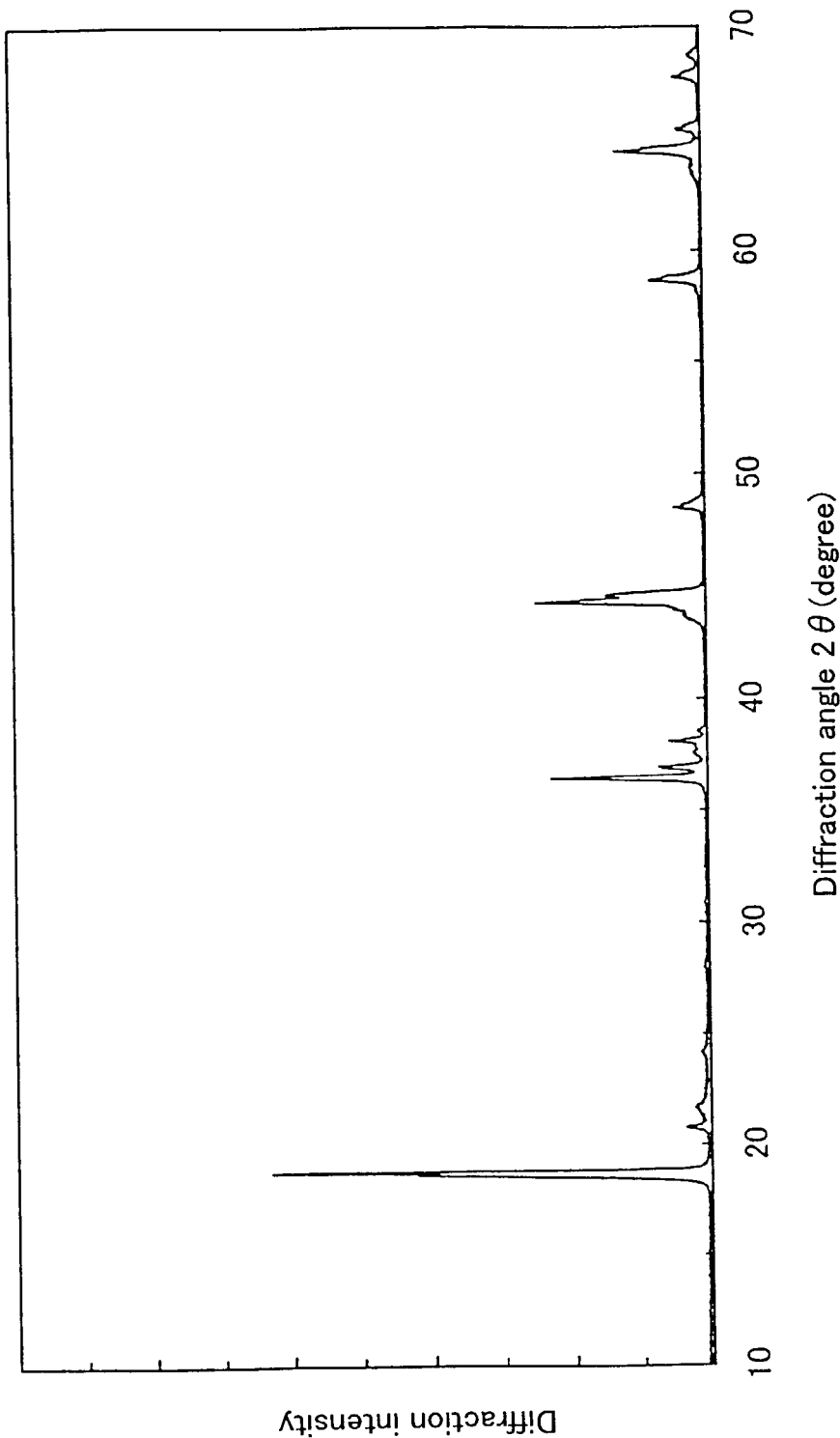
FIG. 5 is a view showing an X-ray diffraction pattern of a lithium-containing complex oxide synthesized in Comparative Example 5 according to the present invention.

Hereinafter, the present invention will be described in more detail by way of embodiments. The lithium-containing complex oxide of the present invention is a complex oxide in a very limited composition range based on a composition containing at least Ni and Mn as constituent elements, in which the quantity ratio between Ni and Mn is 1:1, represented by General Formula:

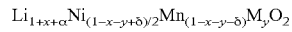

(where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr, Fe, Co, Cu, Zn, Al, Ge and Sn).

According to the present invention, the reason why a lithium-containing complex oxide only in the limited composition range is selected is as follows. In a lithium-manganese oxide, as described above, when the ratio of trivalent Mn is increased, the crystal structure is strained due to the Jahn-Teller effect, and the potential of charging/discharging is lowered. Therefore, it is required to set the valence of Mn to be close to 4. However, as the ratio of tetravalent Mn is increased, a phase transition to a Spinel structure is likely to occur, which necessitates stabilization of the crystal structure.

The inventors of the present invention considered that, in order to solve the above-mentioned problems, it is effective to increase the average valence of Mn by allowing an excess amount of Li to be contained in LiMnO$_2$ or to substitute an element (e.g., Co, Ni, etc.) capable of stably constituting a layered lithium-containing complex oxide for Mn of LiMnO$_2$, and studied the quantity ratio of Li, the kind of substituent elements, and the quantity ratio thereof in detail.

Consequently, the following was found: in a composition range based on the composition represented by General Formula LiNi$_{1/2}$Mn$_{1/2}$O$_2$ in which the quantity ratio between Ni and Mn is 1/2:1/2 (i.e., 1:1), Li is substituted for Ni and Mn by x/2, respectively, the quantity ratio between Ni and Mn is shifted from 1/2:1/2 by δ/2 and −δ/2, respectively, the quantity ratio of Li has a width of α, and an element M (where M is at least one element selected from the group consisting of Ti, Cr, Fe, Co, Cu, Zn, Al, Ge and Sn) is substituted for Ni and Mn by y/2, respectively; that is, in a composition range represented by General Formula:

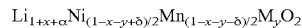

(where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr, Fe, Co, Cu, Zn, Al, Ge and Sn), a lithium-containing complex oxide whose layered crystal structure is stabilized and which is excellent in reversibility of charging/discharging and durability during a charging/discharging cycle in a potential range in the vicinity of 4 V can be obtained. The following also was found: particularly, in the case of y>0, i.e., in the case where the element M is added, a lithium-containing complex oxide having more excellent characteristics can be obtained.

This is considered to be caused by the following: the average valence of Mn in the lithium-containing complex oxide has a value in the vicinity of 4 (about 3.3 to 4); and movement of Mn in the crystal is suppressed in the course of doping of Li and removal of Li during charging/discharging. According to the present invention, as the valence of Mn, a value measured by an X-ray absorption spectrometer was used.

Furthermore, as described above, when the lithium-containing complex oxide containing at least Ni and Mn as constituent elements, having a stable layered structure and being excellent in reversibility of charging/discharging and durability during a charging/discharging cycle, is subjected to an X-ray diffraction measurement using a CuKα-ray, diffraction peaks corresponding to those of (003) and (104) of $LiNiO_2$ are present at a diffraction angle 2θ in the vicinity of 18° and 44°, one for each, and in a range of 63° to 66°, two diffraction peaks corresponding to those of (108) and (110) are present. Thus, it was found that the above-mentioned lithium-containing complex oxide is a single-phase complex oxide having the same characteristics as those of $LiNiO_2$.

The diffraction pattern was studied in more detail. Consequently, the following also was found: assuming that the areas of the diffraction peaks in the vicinity of 18° and 44° (i.e., accumulated intensity) are $I_8$ and $I_{44}$, the ratio $I_{44}/I_{18}$ is $0.9 < I_{44}/I_{18} \leq 1.2$ (when $0 \leq y \leq 0.2$) or $0.7 \leq I_{44}/I_{18} \leq 1$ (when $0.2 \leq y \leq 0.4$), and the difference θa between diffraction angles (2θ) of two diffraction peaks in the above-mentioned range of 63° to 66° is $0.30 \leq θa \leq 0.6°$ (when $0 \leq y \leq 0.2$) or $0.55° \leq θa \leq 90.75$ (when $0.2 \leq y \leq 0.4$).

The lithium-containing complex oxide having such a charging/discharging curve can be charged/discharged in a voltage range in the vicinity of 4 V in the same way as in $LiMn_2O_4$ having a Spinel structure, and can be substituted for $LiCoO_2$ that is a conventional positive active material.

It also was found that the lithium-containing complex oxide having the above-mentioned composition has a large true density (i.e., 4.55 to 4.95 g/cm³) and a high volume energy density. The true density of the lithium-containing complex oxide containing Mn in a predetermined range is varied largely depending upon the composition thereof. However, its structure is stabilized and a single phase is likely to be formed in the above-mentioned narrow composition range. Therefore, the above-mentioned lithium-containing complex oxide is considered to have a large true density dose to that of $LiCoO_2$. Particularly in the case of a composition close to a stoichiometric ratio, the true density becomes a large value, and in $-0.015 \leq x+α \leq 0.015$, a high-density complex oxide of about 4.7 g/cm³ or more is obtained.

Furthermore, as described above, the lithium-containing complex oxide of the present invention is based on the composition in which the quantity ratio between Ni and Mn is 1:1 as in $LiNi_{1/2}Mn_{1/2}O_2$. However, the composition was studied in more detail, the following was found: a lithium-containing complex oxide having particularly excellent characteristics can be obtained in the vicinity of the composition where the quantity ratio of Ni, Mn and M is 1:1:1 (i.e., the composition represented by General Formula:

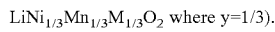
$LiNi_{1/3}Mn_{1/3}M_{1/3}O_2$ where y=1/3).

In the above-mentioned General Formula:

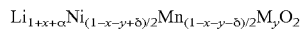
$Li_{1+x+α}Ni_{(1-x-y+δ)/2}Mn_{(1-x-y-δ)/2}M_yO_2$ (where M is at least one element selected from the group consisting of Ti, Cr, Fe, Co, Cu, Zn, Al, Ge and Sn), in the composition range of $0 \leq y \leq 0.2$, only a small shift (δ/2) in quantity ratio between Ni and Mn can be permitted, whereas in the composition range of $0.2 < y \leq 0.4$, the stability of the crystal structure becomes higher, and a single phase is likely to be formed. As a result, even if a shift in quantity ratio between Ni and Mn is increased, an intended lithium-containing complex oxide can be obtained. Therefore, in the above-mentioned General Formula, when $0 \leq y \leq 0.2$, the range of δ becomes narrow (i.e., $-0.1 \leq δ \leq 0.1$), whereas when $0.2 < y \leq 0.4$, the range of δ becomes wide (i.e., $-0.24 \leq δ \leq 0.24$).

Furthermore, in the composition range of $0.2 < y \leq 0.4$, the true density becomes larger than that of the compound in the composition range of $0 \leq y \leq 0.2$. Therefore, it also was clarified that such a material is suitable for a higher capacity. More specifically, a compound with a stoichiometric composition has a true density of about 4.75 to 4.95 g/cm³ in the composition range of $0.2 < y \leq 0.4$, whereas it has a true density of about 4.55 to 4.74 g/cm3 in the composition range of $0 \leq y \leq 0.2$.

Herein, the reason why the upper limit value of y is set to be 0.4 is that when the composition at y>0.4, i.e., the substitution amount by the element M becomes larger than 0.4, a heterogeneous phase is likely to be formed in an intended complex oxide, impairing the stability of the compound.

The use of a compound in a very wide composition range containing a composition range of the lithium-containing complex oxide of the present invention as a material for a positive electrode of a non-aqueous secondary battery has already been disclosed in JP 3064655 B, JP 9(1997)-199127 A, JP 10(1998)-69910 A, JP 2000-294242 A, and the like. However, none of them discloses that a lithium-containing complex oxide having particularly excellent characteristics is obtained in a limited composition range where the quantity ratio between Ni and Mn is in the vicinity of 1:1 as disclosed by the present invention. Thus, the present invention would not have been obvious over these prior arts.

In the above-mentioned lithium-containing complex oxide, it is very difficult to obtain a single phase only by mixing a Li compound, a Mn compound, a Ni compound, and the like, followed by sintering.

The reason for this is considered as follows: since the diffusion speed of Ni, Mn and the like in a solid is low, it is difficult to allow them to be diffused uniformly in a synthesis reaction, so that they are not distributed uniformly in a generated oxide.

The inventors of the present invention also studied a method for synthesizing the above-mentioned oxide in detail, and consequently, found that a single phase of the lithium-containing complex oxide of the present invention can be synthesized relatively easily by sintering a complex compound containing at least Ni and Mn as constituent elements and a Li compound. More specifically, a complex compound of constituent elements such as Ni and Mn is synthesized previously, and the resultant compound is sintered together with a Li compound, whereby the metal element is distributed uniformly during the reaction of formation of the oxide, and hence, the formation of a single phase can be simplified. Needless to say, the method for synthesizing the lithium-containing complex oxide of the present invention is not limited to the above method. However, the physical properties (i.e., the structure stability, reversibility of charging/discharging, true density, and the like) of a complex oxide to be generated are considered to be varied largely depending upon which synthesis process is used.

Herein, as the complex compound containing at least Ni and Mn as constituent elements, for example, a coprecipitated compound containing at least Ni and Mn, a hydrothermally synthesized compound containing at least Ni and Mn, a mechanically synthesized compound containing at least Ni and Mn, and compounds obtained by heat-treating these compounds may be used. An oxide or a hydroxide of Ni and Mn such as $Ni_{0.5}Mn_{0.5}(OH)_2$, $NiMn_2O_4$, and $Ni_{0.5}Mn_{0.5}OOH$ can be used preferably. In the case of synthesizing a lithium-containing complex oxide containing M as a constituent element (M is at least one element selected from the group consisting of Ti, Cr, Fe, Co, Cu, Zn, Al, Ge and Sn), an intended oxide can be obtained by mixing a complex compound containing at least Ni and Mn, a Li compound, and a compound containing M, followed by sintering. If possible, it is preferable to use a complex oxide containing M in addition to Ni and Mn from the beginning. The quantity ratio of Ni, Mn and M in the above-mentioned complex compound should be selected appropriately in accordance with the composition of an intended lithium-containing complex oxide.

As the Li compound, various lithium salts can be used. Examples of the lithium salts include lithium hydroxide.monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, lithium oxide, and the like. Among them, lithium hydroxide.monohydrate is used most preferably because it does not generate gas that adversely affects an environment, such as carbon dioxide, nitrogen oxide, and sulfur oxide.

The complex compound containing at least Ni and Mn as constituent elements and the Li compound are mixed in a ratio substantially in accordance with the composition of an intended lithium-containing complex oxide. For example, the mixture is sintered in an atmosphere containing oxygen at 700° C. to 1100° C. for 1 to 24 hours, whereby a lithium-containing complex oxide of the present invention can be synthesized.

Regarding the heat treatment for the above-mentioned sintering, it is preferable that the mixture is once heated to a temperature (about 250° C. to 850° C.) lower than a sintering temperature instead of being heated to a predetermined temperature directly, pre-heated at the temperature, and further heated to a sintering temperature so as to effect a reaction. The reason for this is as follows: in the generation process of the lithium-containing complex oxide of the present invention, the reaction between the Li compound and the complex compound containing at least Ni and Mn as constituent elements is effected in stages, and the lithium-containing complex oxide is generated finally via an intermediate product. More specifically, in the case where the mixture is heated to a sintering temperature directly, the Li compound and the complex compound containing at least Ni and Mn as constituent elements are reacted partially up to the final stage, and the lithium-containing complex oxide thus generated may hinder the reaction of an unreacted substance and impair the uniformity of the composition. Furthermore, in order to shorten a time required for a reaction process and obtain a homogeneous lithium-containing complex oxide, it is effective to conduct heating in stages. The time for pre-heating is not particularly limited; however, it should be conducted generally for about 0.5 to 30 hours.

Furthermore, in the process of sintering the mixture of the Li compound and the complex compound containing at least Ni and Mn as constituent elements, a mixture obtained in a dry state may be used as it is. However, it is preferable that the mixture is dispersed in a solvent such as ethanol to form a slurry, and mixed in a planet type ball mill for about 30 to 60 minutes, followed by drying. This is because the homogeneity of the lithium-containing complex oxide to be synthesized is enhanced further.

The above-mentioned heat treatment should be conducted in an atmosphere containing oxygen, i.e., in the air, in an environment of a mixture of inert gas (e.g., argon, helium, nitrogen, etc.) and oxygen gas, or in oxygen gas. The ratio of the oxygen in the environment preferably is set at 10% or more by volume.

The flow rate of the above-mentioned gas is preferably 1 dm$^3$/min. per 100 g of the mixture, more preferably 1 to 5 dm$^3$/min. In the case where the gas flow rate is small, i.e., in the case where the gas flow speed is low, a reaction is effected non-uniformly, whereby an impurity such as $Mn_2O_3$ and $Li_2MnO_3$ is likely to be generated.

By using the lithium-containing complex oxide of the present invention obtained by the above-mentioned method as a positive active material, a non-aqueous secondary battery is produced, for example, as follows.

As a positive electrode, a positive electrode mixture is used as it is, which is obtained by adding, if required, a conductive assistant such as scaly graphite and acetylene black and a binder such as polytetrafluoroethylene and vinylidene polyfluoride to the above-mentioned lithium-containing complex oxide. Alternatively, a substrate that also functions as a charge collector is coated with or impregnated with the positive electrode mixture, whereby the positive electrode mixture is used under the condition of being integrated with the substrate. Examples of the substrate include a net of metal such as aluminum, stainless steel, titanium and copper; punching metal, expanded metal, foamed metal, metal foil, and the like.

As a positive active material, the above-mentioned lithium-containing complex oxide may be used by itself. In addition, the above-mentioned lithium-containing complex oxide may be mixed with another active material, or the lithium-containing complex oxide may be used as a complex with another active material. For example, the electron conductivity of the above-mentioned lithium-containing complex oxide is inferior to that of the lithium-containing cobalt oxide such as $LiCoO_2$. Therefore, a voltage drop is likely to be increased during discharging of a large current or at the end of discharging. However, by using a lithium-containing cobalt oxide excellent in electron conductivity mixed with the lithium-containing complex oxide, the voltage drop can be suppressed, whereby discharge characteristics can be enhanced. As the lithium-containing cobalt oxide, not only $LiCoO_2$ but also a compound such as $LiCo_{1-t}Ni_tO_2$ obtained by substituting another element (e.g., Ni) for a part of Co of $LiCoO_2$ can be used. In this case, if the ratio of the lithium-containing cobalt oxide is increased too much, durability such as high-temperature storage characteristics is likely to be decreased. Therefore, it is required that the ratio of the lithium-containing cobalt oxide is set to be 50% or less by mass, based on the entire active material.

Furthermore, as a negative active material to be opposed to the positive electrode, lithium or a lithium-containing compound generally is used. Examples of the lithium-containing compound include a lithium alloy such as a Li—Al alloy, a Li—Pb alloy, a Li—In alloy and a Li—Ga alloy; elements capable of forming an alloy with lithium such as Si, Sn, and a Mg-Si alloy; and an alloy mainly containing these elements. Furthermore, a carbon material such as graphite and fibrous carbon, a lithium-containing complex nitride, and the like can be used in addition to an oxide material such as a Sn oxide and a Si oxide. Furthermore, the above-mentioned plurality of materials may be combined, and a complex of a carbon material and Si also is used preferably. The same method as that of the positive electrode also applies to the production of the negative electrode.

Although varied depending upon the kind of a negative active material, the ratio between the positive and negative active materials generally is set as (mass of a positive active material)/(mass of a negative active material)=1.5 to 3.5, whereby the characteristics of the lithium-containing complex oxide can be utilized. In the case of using, as a negative active material, elements capable of forming an alloy with lithium, an alloy mainly containing these elements, a lithium-containing complex nitride, or a complex of these materials with another component such as a carbon material, the capacity of the negative electrode becomes too large at the above-mentioned ratio. Therefore, it is desirable to set (mass of a positive active material)/(mass of a negative active material) to be 4 to 7.

Examples of a non-aqueous electrolyte in the non-aqueous secondary battery of the present invention include an organic solvent type liquid electrolyte in which an electrolyte is dissolved in an organic solvent (i.e., an electrolytic solution), a polymer electrolyte in which the electrolytic solution is held in a polymer, and the like. Although there is no particular limit to an organic solvent contained in the electrolytic solution or the polymer electrolyte, it is preferable that the organic solvent contains a chain ester in terms of the load characteristics. Examples of the chain ester include chain carbonate such as dimethyl carbonate, diethyl carbonate and ethyl methyl carbonate; ethyl acetate; and methyl propionate. These chain esters may be used alone or in combination. Particularly, in order to enhance low-temperature characteristics, it is preferable that the above-mentioned chain ester occupies 50% by volume of the entire organic solvent. It is particularly preferable that the chain ester occupies 65% by volume or more of the entire organic solvent.

The organic solvent preferably is composed of the above-mentioned chain ester mixed with another ester having a high dielectric constant (30 or more), so as to enhance a discharge capacity, instead of being composed of only the above-mentioned chain ester. Examples of such an ester include cyclic carbonate such as ethylene carbonate, propylene carbonate, butylene carbonate and vinylene carbonate, γ-butylolactone, ethylene glycol sulfite, and the like. In particular, an ester with a cyclic structure such as ethylene carbonate and propylene carbonate is more preferable.

An ester with such a high dielectric constant is contained preferably in an amount of 10% by volume, more preferably 20% by volume, based on the entire organic solvent, in terms of the discharge capacity. Furthermore, in terms of the load characteristics, the ester is contained preferably in an amount of 40% by volume or less, more preferably 30% by volume or less.

Furthermore, examples of the solvent that can be used other than the ester having a high dielectric constant include 1,2-dimethoxyethane, 1,3-dioxolane, tetrahydrofuran, 2-methyl-tetrahydrofuran, diethylether, and the like. In addition, an amineimide type organic solvent, a sulfur-containing or fluorine-containing organic solvent, and the like can be used.

As an electrolyte to be dissolved in the organic solvent, for example, $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$), and the like are used alone or in combination. Among them, $LiPF_6$, $LiC_4F_9SO_3$, and the like that allow satisfactory charge/discharge characteristics to be obtained are used preferably. Although there is no particular limit to the concentration of the electrolyte in the electrolytic solution, the concentration is preferably about 0.3 to 1.7 $mol/dm^3$, more preferably about 0.4 to 1.5 $mol/dm^3$.

Furthermore, for the purpose of enhancing the safety and storage characteristics of a battery, an aromatic compound may be contained in a non-aqueous electrolytic solution. As the aromatic compound, benzenes having an alkyl group such as cyclohexylbenzene and t-butylbenzene, biphenyl, or fluorobenzenes are used preferably It is preferable that a separator has sufficient strength and is capable of holding a large quantity of electrolytic solution. In view of this, a micro-porous film made of polypropylene, polyethylene, polyolefin such as a copolymer of propylene and ethylene, a nonwoven fabric, and the like with a thickness of 5 to 50 μm are used preferably. Particularly, in the case of using a thin separator (5 to 20 μm), battery characteristics such as a charge/discharge cycle and high-temperature storage are likely to be degraded. However, since the lithium-containing complex oxide of the present invention is excellent in safety, even if such a thin separator is used, a battery is allowed to function with stability.

Hereinafter, the present invention will be described by way of examples. The present invention is not limited to the examples.

EXAMPLE 1

Ammonium water with its pH adjusted to about 12 by addition of sodium hydroxide was placed in a reaction container. While strongly stirring the ammonium water, a mixed aqueous solution containing nickel sulfate and manganese nitrate in an amount of 1 $mol/dm^3$, respectively, and 25% by mass of ammonium water were dropped onto the reaction container at 46 $cm^3$/min. and 3.3 $cm^3$/min., respectively, by using a metering pump, whereby a coprecipitated compound of Ni and Mn was generated. At this time, a sodium hydroxide aqueous solution with a concentration of 3.2 $mol/dm^3$ also was dropped simultaneously so that the temperature of the reaction solution was kept at 50° C. and the pH thereof was kept at about 12. Furthermore, the reaction was effected while nitrogen gas was purged at a rate of 1 $dm^3$/min. so that the atmosphere of the reaction solution became inactive.

The product thus obtained was washed with water, filtered and dried to obtain a hydride containing Ni and Mn in a ratio of 1:1. Then, 0.2 mol of the hydride and 0.198 mol of $LiOH \cdot H_2O$ were obtained, and the mixture was dispersed in ethanol to form a slurry. Thereafter, the slurry was mixed in a planet type ball mill for 40 minutes, and dried at room temperature to prepare a mixture. Then, the mixture was placed in a crucible made of alumina, and heated to 800° C. at an air flow of 1 $dm^3$/min. The mixture was kept at that temperature for 2 hours, whereby preheating was conducted. The temperature was raised further to 1000° C., and the mixture was sintered for 12 hours, whereby a lithium-containing complex oxide was synthesized. The prepared compound was ground in a mortar and stored as powder in a desicator.

The above-mentioned oxide powder was measured for a composition by an atomic absorption spectrometer, revealing that the composition was represented by $Li_{0.99}Ni_{0.5}Mn_{0.5}O_2$. Furthermore, in order to analyze the state of the above-mentioned compound, X-ray absorption spectroscopy (XAS) of Mn was conducted, using BL4 beam port of superconducting small radiation source "Aurora" (produced by Sumitomo Electric Industries, Ltd.) at SR center of Ritsumeikan University. The data thus obtained was analyzed with analysis software "REX" (produced by Rigaku Denki), based on the Literature (Journal of the Electrochemical Society, 146 P2799-2809 (1999)). In order to determine the valence of Mn of the above-mentioned compound, as reference samples, $MnO_2$ and $LiNi_{0.5}Mn_{1.5}O_4$ (both of them are reference samples as compounds having Mn of which average valence is 4), $LiMn_2O_4$ (reference sample as a compound having Mn of which average valence is 3.5), $LiMnO_2$ and $MnO_2O_3$ (both of them are reference samples as compounds having Mn of which average valence is 3), and MnO (reference sample as a compound having Mn of which average valence is 2) were used. A regression line representing the relationship between the K absorption edge position of Mn of each reference sample and the valence of Mn was obtained. As a result, the K absorption edge position of $MnO_2$ was substantially the same as that of $LiNi_{0.5}Mn_{1.5}O_4$. Therefore, the average valence of Mn of the above-mentioned compound was determined to be about 4.

Regarding Ni, it was not possible to obtain a compound appropriate as a reference sample having Ni with a valence of 3 or more, so that its exact valence was not obtained. However, the K absorption edge position of the reference sample having Ni was substantially the same as that of NiO and $LiNi_{0.5}Mn_{1.5}O_4$ that are compounds having Ni of which average valence is 2. Therefore, it was assumed that the average valence of Ni of the above-mentioned compound is about 2.

EXAMPLE 2

First, 0.198 mol of hydroxide containing Ni and Mn in a ratio of 1:1, synthesized in the same way as in Example 1 and 0.202 mol of $LiOH \cdot H_2O$ were obtained, and a lithium-containing complex oxide represented by $Li_{1.01}Ni_{0.495}Mn_{0.495}O_2$ was synthesized in the same way as in Example 1.

EXAMPLE 3

First, 0.196 mol of hydroxide containing Ni and Mn in a ratio of 1:1, synthesized in the same way as in Example 1 and 0.204 mol of $LiOH \cdot H_2O$ were obtained, and a lithium-containing complex oxide represented by $Li_{1.02}Ni_{0.49}Mn_{0.49}O_2$ was synthesized in the same way as in Example 1.

EXAMPLE 4

First, 0.194 mol of hydroxide containing Ni and Mn in a ratio of 1:1, synthesized in the same way as in Example 1 and 0.206 mol of $LiOH \cdot H_2O$ were obtained, and a lithium-containing complex oxide represented by $Li_{1.03}Ni_{0.485}Mn_{0.485}O_2$ was synthesized in the same way as in Example 1.

EXAMPLE 5

First, 0.192 mol of hydroxide containing Ni and Mn in a ratio of 1:1, synthesized in the same way as in Example 1 and 0.208 mol of $LiOH \cdot H_2O$ were obtained, and a lithium-containing complex oxide represented by $Li_{1.04}Ni_{0.48}Mn_{0.48}O_2$ was synthesized in the same way as in Example 1.

EXAMPLE 6

First, 0.19 mol of hydroxide containing Ni and Mn in a ratio of 1:1, synthesized in the same way as in Example 1 and 0.21 mol of $LiOH \cdot H_2O$ were obtained, and a lithium-containing complex oxide represented by $Li_{1.05}Ni_{0.475}Mn_{0.475}O_2$ was synthesized in the same way as in Example 1.

EXAMPLE 7

A hydroxide containing Ni, Mn and Co in a ratio of 4.5:4.5:1 was synthesized in the same way as in Example 1, except that a mixed aqueous solution containing nickel sulfate, manganese nitrate and cobalt sulfate in a ratio of 0.9 mol/dm$^3$, 0.9 mol/dm$^3$ and 0.2 mol/dm$^3$, respectively, was dropped. A lithium-containing complex oxide represented by $Li_{0.99}Ni_{0.45}Mn_{0.45}Co_{0.1}O_2$ was synthesized in the same way as in Example 1.

EXAMPLE 8

A lithium-containing complex oxide represented by $Li_{0.99}Ni_{0.375}Mn_{0.375}Co_{0.25}O_2$ was synthesized in the same way as in Example 1, except that a mixed aqueous solution containing nickel sulfate, manganese nitrate and cobalt sulfate in a ratio of 0.75 mol/dm$^3$, 0.75 mol/dm$^3$ and 0.5 mol/dm$^3$, respectively, was dropped.

EXAMPLE 9

A lithium-containing complex oxide represented by $Li_{0.99}Ni_{0.34}Mn_{0.33}Co_{0.33}O_2$ was synthesized in the same way as in Example 1, except that a mixed aqueous solution containing nickel sulfate, manganese nitrate and cobalt sulfate in a ratio of 0.67 mol/dm$^3$, 0.66 mol/dm$^3$ and 0.66 mol/dm$^3$, respectively, was dropped.

EXAMPLE 10

A lithium-containing complex oxide represented by $Li_{0.99}Ni_{0.3}Mn_{0.3}Co_{0.4}O_2$ was synthesized in the same way as in Example 1, except that a mixed aqueous solution containing nickel sulfate, manganese nitrate and cobalt sulfate in a ratio of 0.6 mol/dm$^3$, 0.6 mol/dm$^3$ and 0.8 mol/dm$^3$, respectively, was dropped.

COMPARATIVE EXAMPLE 1

First, 0.2 mol of $LiOH \cdot H_2O$ and 0.2 mol of MnOOH were obtained and mixed in a planet type ball mill for 30 min. to obtain a mixture. The mixture was placed in a crucible made of alumina. The mixture was sintered at 450° C. for 10 hours at a nitrogen stream of 1 dm$^3$/min, whereby orthorhombic lithium-manganese oxide represented by $LiMnO_2$ was synthesized.

COMPARATIVE EXAMPLE 2

0.18 mol of hydroxide containing Ni and Mn in a ratio of 1:1 synthesized in the same way as in Example 1 and 0.22 mol of $LiOH \cdot H_2O$ were obtained, and a lithium-containing complex oxide represented by $Li_{1.1}Ni_{0.45}Mn_{0.45}O_2$ was synthesized in the same way as in Example 1.

COMPARATIVE EXAMPLE 3

A lithium-containing complex oxide represented by $Li_{0.99}Ni_{0.25}Mn_{0.25}Co_{0.5}O_2$ was synthesized in the same way as in Example 1, except that a mixed aqueous solution containing nickel sulfate, manganese nitrate and cobalt sulfate in an amount of 0.5 mol/dm$^3$, 0.5 mol/dm$^3$ and 1 mol/dm$^3$, respectively, was dropped.

COMPARATIVE EXAMPLE 4

A lithium-containing complex oxide represented by $Li_{0.99}Ni_{0.2}Mn_{0.2}Co_{0.6}O_2$ was synthesized in the same way as in Example 1, except that a mixed aqueous solution containing nickel sulfate, manganese nitrate and cobalt sulfate in an amount of 0.4 mol/dm$^3$, 0.4 mol/dm$^3$ and 1.2 mol/dm$^3$, respectively, was dropped.

COMPARATIVE EXAMPLE 5

A lithium-containing complex oxide represented by $Li_{0.99}Ni_{0.25}Mn_{0.75}O_2$ was synthesized in the same way as in Example 1, except that a mixed aqueous solution containing nickel sulfate and manganese nitrate in an amount of 0.5 mol/dm$^3$ and 1.5 mol/dm$^3$, respectively, was dropped.

COMPARATIVE EXAMPLE 6

A lithium-containing complex oxide represented by $Li_{0.99}Ni_{0.6}Mn_{0.3}Co_{0.1}O_2$ was synthesized in the same way as in Example 7, except that the ratio between nickel sulfate and manganese nitrate is 1.2 mol/dm$^3$ and 0.6 mol/dm$^3$, respectively. More specifically, the lithium-containing complex oxide in Comparative Example 6 is different from Example 7 only in an amount ratio between Ni and Mn.

REFERENCE EXAMPLE

First, 0.2 mol of LiOH.H$_2$O and 0.1 mol of Ni(OH)$_2$, and 0.1 mol of MnOOH were obtained and mixed in a planet type ball mill for 30 minutes to obtain a mixture. The mixture was placed in a crucible made of alumina, and sintered in the air at 800° C. for 10 hours, whereby a lithium-containing complex oxide represented by $LiNi_{0.5}Mn_{0.5}O_2$ was synthesized.

Table 1 shows the list of the respective lithium-containing complex oxides synthesized in Examples 1 to 10, Comparative Examples 1 to 6, and Reference Example.

The above-mentioned lithium-containing complex oxides in Examples 1 to 10 of the present invention, Comparative Examples 1 to 6, and Reference Example were subjected to X-ray diffraction measurement using a CuKα line. The lithium-containing complex oxides in Examples 1 to 10 of the present invention, Comparative Examples 2 to 6, and Reference Example exhibited X-ray diffraction patterns similar to that of LiNiO$_2$ having a layered structure, whereas a peak representing the generation of a heterogeneous phase was recognized in the X-ray diffraction patterns in Comparative Examples 3 to 5 and Reference Example. Furthermore, the X-ray diffraction pattern in Comparative Example 1 is an orthorhombic pattern different from that of LiNiO$_2$. In Examples 1 to 10 of the present invention, and Comparative Examples 2 and 6, a peak caused by the generation of a heterogeneous phase was not recognized. More specifically, there was one diffraction peak where a diffraction angle 2θ was in the vicinity of 18°, there was one diffraction peak where a diffraction angle 2θ was in the vicinity of 44°, and there were two diffraction peaks where the diffraction angle 2θ was present in the vicinity of 63° to 660. Thus, the obtained oxide was recognized to be a single phase of the lithium-containing complex oxide having a structure similar to that of LiNiO$_2$. In the diffraction peak where the diffraction angle 2θ was present in a range of 63° to 66°, a peak by a Kα$_2$ line also was recognized adjacent to a peak by a Kα$_1$ line of Cu. According to the present invention, as the diffraction peak where the diffraction angle 2θ was present in a range of 63° to 66°, only a peak by the Kα$_1$ line is considered.

Among the above diffraction patterns, the X-ray diffraction patterns in Examples 1, 8, 9, Comparative Example 4 and 5 are illustrated in FIGS. 1 to 5.

Table 2 shows values obtained by measuring the ratio ($I_{44}/I_{18}$) between the accumulated intensities $I_{18}$ and $I_{44}$ of the diffraction peaks in the vicinity of 18° and 44°, and the difference θa in diffraction angle between two diffraction peaks in a range of 63° to 66°. The lithium-containing complex oxide in Comparative Example 1 is different from that of the present invention in crystal structure. In the lithium-containing complex oxides in Comparative Examples 3 to 5 and Reference Example, at least three diffraction peaks were present in a range of 63° to 66° due to the generation of a heterogeneous phase. Therefore, Table 2 does not describe the data of these compounds.

TABLE 1

| | Composition [$Li_{1+x+\alpha}Ni_{(1-x-y+\delta)/2}Mn_{(1-x-y-\delta)/2}M_yO_2$] | | | | |
|---|---|---|---|---|---|
| | | x | x + α | y | δ |
| Example 1 | $Li_{0.99}Ni_{0.5}Mn_{0.5}O_2$ | 0 | −0.01 | 0 | 0 |
| Example 2 | $Li_{1.01}Ni_{0.495}Mn_{0.495}O_2$ | 0.01 | 0.01 | 0 | 0 |
| Example 3 | $Li_{1.02}Ni_{0.49}Mn_{0.49}O_2$ | 0.02 | 0.02 | 0 | 0 |
| Example 4 | $Li_{1.03}Ni_{0.485}Mn_{0.485}O_2$ | 0.03 | 0.03 | 0 | 0 |
| Example 5 | $Li_{1.04}Ni_{0.48}Mn_{0.48}O_2$ | 0.04 | 0.04 | 0 | 0 |
| Example 6 | $Li_{1.05}Ni_{0.475}Mn_{0.475}O_2$ | 0.05 | 0.05 | 0 | 0 |
| Example 7 | $Li_{0.99}Ni_{0.45}Mn_{0.45}Co_{0.1}O_2$ | 0 | −0.01 | 0.1 | 0 |
| Example 8 | $Li_{0.99}Ni_{0.375}Mn_{0.375}Co_{0.25}O_2$ | 0 | −0.01 | 0.25 | 0 |
| Example 9 | $Li_{0.99}Ni_{0.34}Mn_{0.33}Co_{0.33}O_2$ | 0 | −0.01 | 0.33 | 0.01 |
| Example 10 | $Li_{0.99}Ni_{0.3}Mn_{0.3}Co_{0.4}O_2$ | 0 | −0.01 | 0.4 | 0 |
| Comparative Example 1 | $LiMnO_2$ | 0 | 0 | 0 | −1 |
| Comparative Example 2 | $Li_{1.1}Ni_{0.45}Mn_{0.45}O_2$ | 0.1 | 0.1 | 0 | 0 |
| Comparative Example 3 | $Li_{0.99}Ni_{0.25}Mn_{0.25}Co_{0.5}O_2$ | 0 | −0.01 | 0.5 | 0 |
| Comparative Example 4 | $Li_{0.99}Ni_{0.2}Mn_{0.2}Co_{0.6}O_2$ | 0 | −0.01 | 0.6 | 0 |
| Comparative Example 5 | $Li_{0.99}Ni_{0.25}Mn_{0.75}O_2$ | 0 | −0.01 | 0 | −0.5 |
| Comparative Example 6 | $Li_{0.99}Ni_{0.6}Mn_{0.3}Co_{0.1}O_2$ | 0 | −0.01 | 0.1 | 0.3 |
| Reference Example | $LiNi_{0.5}Mn_{0.5}O_2$ | 0 | 0 | 0 | 0 |

TABLE 2

| | X-ray diffraction measurement | |
|---|---|---|
| | Ratio of accumulated intensity ($I_{44}/I_{18}$) | Difference in diffraction angle 2θ (°) |
| Example 1 | 1.13 | 0.313 |
| Example 2 | 1.14 | 0.348 |
| Example 3 | 1.10 | 0.390 |
| Example 4 | 1.11 | 0.435 |
| Example 5 | 1.08 | 0.510 |
| Example 6 | 1.06 | 0.555 |
| Example 7 | 1.04 | 0.553 |
| Example 8 | 0.88 | 0.672 |
| Example 9 | 0.83 | 0.700 |
| Example 10 | 0.77 | 0.617 |
| Comparative Example 2 | 0.99 | 0.625 |
| Comparative Example 6 | 0.83 | 0.600 |

In the lithium-containing complex oxides in Examples 1 to 7 where $0 \leq y \leq 0.2$, the accumulated intensity ratio $I_{44}/I_{18}$ was in a range of 0.9 to 1.2, and the diffraction angle difference θa was in a range of 0.3° to 0.6°. Furthermore, in Examples 8 to 10 where $0.2 \leq y \leq 0.4$, $I_{44}/I_{18}$ was in a range of 0.7 to 1, and θa was in a range of 0.55° to 0.75°. On the other hand, in Comparative Examples 2 and 6 where the composition was out of the range of the present invention, $I_{44}/I_{18}$ or θa deviated from the above range. In Comparative Examples 3 to 5 and Reference Example, at least three diffraction peaks were present in a range of 63° to 66°.

Next, the lithium-containing complex oxides in Examples 1 to 10 of the present invention, Comparative Examples 1 to 6, and Reference Example were measured for the true density, using a true density measurement apparatus. Table 3 shows the results. The measurement error was ±0.03 g/cm³ at maximum.

TABLE 3

|  | True density (g/cm³) |
|---|---|
| Example 1 | 4.74 |
| Example 2 | 4.72 |
| Example 3 | 4.68 |
| Example 4 | 4.65 |
| Example 5 | 4.62 |
| Example 6 | 4.57 |
| Example 7 | 4.75 |
| Example 8 | 4.76 |
| Example 9 | 4.80 |
| Example 10 | 4.82 |
| Comparative Example 1 | 4.20 |
| Comparative Example 2 | 4.38 |
| Comparative Example 3 | 4.83 |
| Comparative Example 4 | 4.90 |
| Comparative Example 5 | 4.46 |
| Comparative Example 6 | 4.65 |
| Reference Example | 4.61 |

In the lithium-containing complex oxides in Examples 1 to 10 of the present invention, the true density was 4.57 to 4.82 g/cm³. Particularly, in Examples 1, 2, and 7 to 10 where the oxide had substantially a stoichiometric composition (i.e., $-0.015 \leq x+\alpha \leq 0.015$), the true density had a large value (i.e., 4.7 g/cm³ or more). Among them, in Examples 8 to 10 where a substitution amount y of the element M was $0.2 < y \leq 0.4$, the largest true density (i.e., 4.76 g/cm³ or more) was obtained.

On the other hand, in Comparative Example 1 using a conventional orthorhombic complex oxide, and Comparative Example 2 where the oxide had a composition remarkably shifted from the stoichiometric composition, the true density had a small value (i.e., 4.5 g/cm³ or less). In Comparative Examples 5 and 6 where the ratio between Ni and Mn was out of the range of the present invention, irrespective of whether the oxide had substantially a stoichiometric composition, the true density was decreased, compared with Examples 1, 2, and 7 to 10 of the present invention. Furthermore, the lithium-containing complex oxide in Reference Example had poor homogeneity due to the generation of a heterogeneous phase or the remaining unreacted substance. Therefore, the true density in Reference Example was decreased, compared with the lithium-containing complex oxide in Example 1.

Herein, the true densities of the lithium-containing complex oxides in Comparative examples 3 and 4 were higher than those of the examples of the present invention. This is not because complex oxides with the true density shown in Table 3 were obtained as a single phase, but because about 5.1 g/cm³ of $LiCoO_2$ was generated as a heterogeneous phase.

Next, the lithium-containing complex oxides in Examples 1 to 10 of the present invention and Comparative Examples 1 and 2 were measured for discharge capacity by the following method.

First, 250 parts by mass of N-methyl-2-pyrrolidone were added to 20 parts by mass of polyvinylidene fluoride as a binder, and the mixture was heated to 60° C. to dissolve polyvinylidene fluoride in N-methyl-2-pyrrolidone, whereby a binder solution was prepared. The above-mentioned lithium-containing complex oxide was added in an amount of 450 parts by mass as a positive active material to the binder solution. Furthermore, 5 parts by mass of carbon black and 25 parts by mass of graphite were added, as a conductive assistant, to the resultant mixture, followed by stirring to prepare a coating in the form of a slurry. The coating thus obtained was applied to both surfaces of an aluminum foil (thickness: 20 µm) uniformly, and dried. Thereafter, the aluminum foil with the coating applied thereto was subjected to pressure forming by a roller press. The resultant aluminum foil was cut to a band-shaped positive electrode (483 mm×54 mm) having an average thickness of 190 µm.

A separator made of a miroporous polyethylene film (thickness: 25 µm) was placed between the positive electrode produced as described above and a negative electrode made of a lithium foil. A non-aqueous solution was used as an electrolyte, in which $LiPF_6$ was dissolved in a concentration of 1.0 mol/dm³ in a mixed solvent containing ethylene carbonate and ethyl methyl carbonate in a volume ratio of 1:3. A reference electrode of lithium was placed. Thus, a battery for evaluating the discharge capacity of the positive electrode was assembled.

Figure 6:
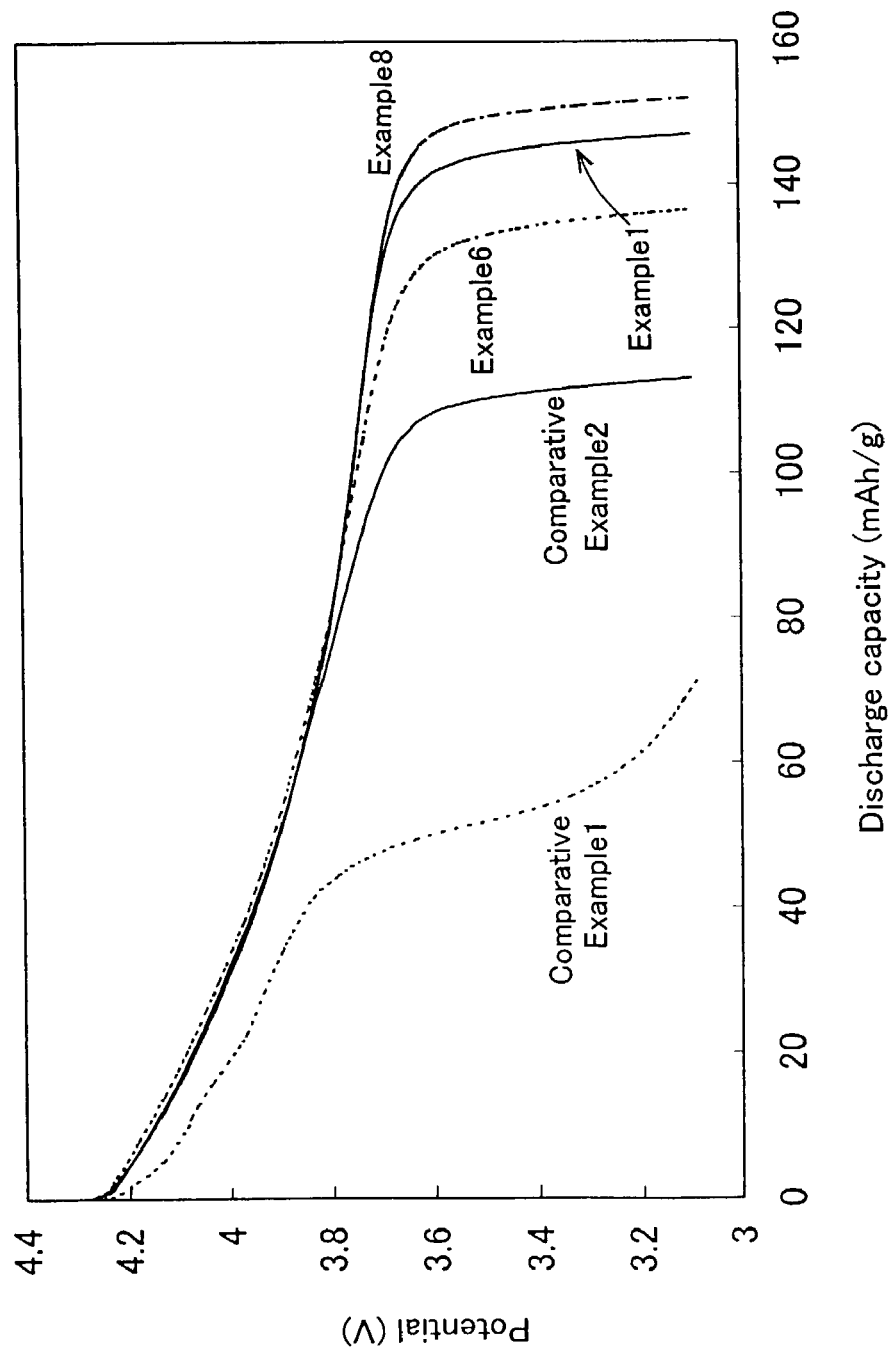
FIG. 6 is a view showing discharge curves of positive electrodes of batteries using, for positive electrodes, the lithium-containing complex oxides synthesized in Examples 1, 6, and 8 according to the present invention, and Comparative Examples 1 and 2.

The above battery was charged to 4.3 V at a current density with respective to the area of the positive electrode of 0.2 mA/cm², and discharged to 3.1 V at the same current density, whereby the discharge capacity was measured. Table 4 shows values obtained by converting the measured discharge capacities into values per unit mass (mAh/g) and per unit volume (mAh/cm³) of the positive active material FIG. 6 shows discharge curves of the positive electrodes of the batteries using the lithium-containing complex oxides in Examples 1, 6, 8, and Comparative Examples 1 and 2.

TABLE 4

|  | Discharge capacity | |
|---|---|---|
| Positive active material | (mAh/g) | (mAh/cm³) |
| Example 1 | 148 | 702 |
| Example 2 | 145 | 684 |
| Example 3 | 143 | 669 |
| Example 4 | 141 | 656 |
| Example 5 | 139 | 642 |
| Example 6 | 136 | 622 |
| Example 7 | 150 | 713 |
| Example 8 | 152 | 724 |
| Example 9 | 153 | 734 |
| Example 10 | 153 | 737 |
| Comparative Example 1 | 70 | 294 |
| Comparative Example 2 | 112 | 491 |

The lithium-containing complex oxides in Examples 1 to 10 of the present invention are capable of being operated at a high discharge potential of 3.5 V or more, and exhibited a large discharge capacity (i.e., 136 to 153 mAh/g). In contrast, the lithium-containing complex oxides in Comparative Examples 1 and 2 had a discharge capacity of 130 mAh/g or less, and had a true density smaller than those of the present invention. Therefore, when converted to a discharge capacity per unit volume, the difference in discharge capacity between the oxides of the present invention and those in Comparative Examples 1 and 2 became more conspicuous.

Furthermore, in order to evaluate the characteristics of the above-mentioned lithium-containing complex oxides as a non-aqueous secondary battery, a non-aqueous secondary battery was produced in the following structure.

EXAMPLE 11

By using the lithium-containing complex oxides in Examples 1 and 9 independently as a positive active material, non-aqueous secondary batteries were produced. A positive electrode was obtained by coating an aluminum foil substrate with a paste produced by mixing 92 parts by mass of the positive active material, 4.5 parts by mass of artificial graphite, 0.5 parts by mass of carbon black, and 3 parts by mass of polyvinylidene fluoride, followed by drying and pressure-forming.

A negative electrode was obtained by coating a copper foil substrate with a paste produced by mixing 92 parts by mass of artificial graphite, 3 parts by mass of low-crystalline carbon, and 5 parts by mass of polyvinylidene fluoride.

The above-mentioned positive electrode and negative electrode were wound via a separator made of a microporous polyethylene film (thickness: 16 em). As an electrolyte, a mixed solvent containing ethylene carbonate and ethyl methyl carbonate (volume ratio: 1:2) with $LiPF_6$ dissolved in a concentration of 1.2 mol/dm$^3$ was used. Thus, a cylindrical non-aqueous secondary battery with a capacity of 600 mAh was produced. The mass ratio between the positive active material and the negative active material [(mass of the positive active material)/(mass of the negative active material)] was set at 1.9.

EXAMPLE 12

A non-aqueous secondary battery was produced in the same way as in Example 11, except that 70% by mass of the lithium-containing complex oxide in Example 1 and 30% by mass of $LiCoO_2$ were mixed as a positive active material.

COMPARATIVE EXAMPLE 7

A non-aqueous secondary battery was produced in the same way as in Example 11, except that the lithium-containing complex oxide in Comparative Example 6, $LiCoO_2$ and $LiNi_{0.8}Co_{0.2}O_2$ used for a commercially available non-aqueous secondary battery were used independently as a positive active material.

The non-aqueous secondary batteries in Examples 11 and 12, and Comparative Example 7 were evaluated for cycle characteristics and high-temperature storage characteristics. The cycle characteristics were evaluated based on the ratio (capacity retention ratio (%)) of a discharge capacity after 100 cycles with respect to a discharge capacity in an initial stage of the cycle when charging/discharging was conducted at a current value of 1C (600 mA). The high-temperature storage characteristics were evaluated based on the change in discharge capacity before and after storage when the batteries were retained at 60° C. for 20 days. More specifically, the high-temperature storage characteristics were evaluated based on the ratio (capacity retention ratio (%)) of a discharge capacity after storage with respect to a discharge capacity before storage, obtained by comparing the discharge capacities when charging/discharging was conducted at a current value of 1C before and after storage. Table 5 shows the results of the evaluation of these characteristics.

TABLE 5

| Battery | Positive active material | Capacity retention ratio (%) | |
|---|---|---|---|
| | | Cycle characteristics | High-temperature storage characteristics |
| Example 11 | Example 1 | 96 | 97 |
| | Example 9 | 98 | 98 |
| Example 12 | Example 1 + $LiCoO_2$ | 94 | 96 |
| Comparative Example 7 | Comparative Example 6 | 92 | 87 |
| | $LiCoO_2$ | 88 | 91 |
| | $LiNi_{0.8}Co_{0.2}O_2$ | 93 | 90 |

The non-aqueous secondary batteries in Examples 11 and 12 using the lithium complex oxide of the present invention as a positive active material exhibited excellent cycle characteristics and high-temperature storage characteristics, irrespective of using a thin separator (thickness: 16 μm). On the other hand, the non-aqueous secondary battery in Comparative Example 6 in which the composition was out of the range of the present invention and the non-aqueous secondary battery in Comparative Example 7 using $LiCoO_2$ or $LiNi_{0.8}Co_{0.2}O_2$ used in a commercially available non-aqueous secondary battery as a positive active material exhibited cycle characteristics and high-temperature storage characteristics that were less excellent than those of the present invention.

Furthermore, the batteries in Examples 11 and 12 were discharged at a current value of 2C (1200 mA) so as to check the characteristics thereof during discharge at a large current. As a result, the discharge capacity of the battery in Example 11 was 525 mAh, whereas that of the battery in Example 12 was 573 mAh. Thus, remarkable enhancement of the characteristics was recognized. This is because a lithium-containing cobalt oxide was mixed in the lithium-containing complex oxide of the present invention.

EXAMPLE 13

Furthermore, a non-aqueous secondary battery was produced by using a complex of Si and a carbon material as a negative active material. Si powder and artificial graphite were mixed in a planet type ball mill to form a complex, and the resultant complex was sifted to obtain a negative active material. As a positive active material, the lithium-containing complex oxide in Example 1 was used. Thus, a non-aqueous secondary battery was produced in the same way as in Example 11, except that the above-mentioned active materials were used. The mass ratio between the positive active material and the negative active material was set at 6.6. In this battery, the mass ratio of the positive active material was increased due to the use of a high-capacity material as the negative active material. Therefore, the discharge capacity was increased by about 7% with the same size as that in Example 11.

The above-mentioned non-aqueous secondary battery was measured for a discharge capacity at a discharge current of 2C to obtain 605 mAh. Thus, the battery had excellent characteristics even during discharge at a large current. This is because the load on the positive active material during discharge was reduced due to the increased mass ratio of the positive active material, resulting in a decrease in a voltage drop.

INDUSTRIAL APPLICABILITY

As described above, according to the present invention, because of the composition represented by General Formula:

$Li_{1+x+\alpha}Ni_{(1-x-y+\delta)/2}Mn_{(1-x-y-\delta)/2}M_yO_2$ (where $0 \leq x \leq 0.05$, $-0.05 \leq x+\alpha \leq 0.05$, $0 \leq y \leq 0.4$; $-0.1 \leq \delta \leq 0.1$ (when $0 \leq y \leq 0.2$) or $-0.24 \leq \delta \leq 0.24$ (when $0.2 \leq y \leq 0.4$); and M is at least one element selected from the group consisting of Ti, Cr. Fe, Co, Cu, Zn, Al, Ge and Sn), a high-density lithium-containing complex oxide with high stability of a crystal structure and satisfactory reversibility of charging/discharging can be provided.

Furthermore, due to the use of the above-mentioned lithium-containing complex oxide as a positive active material, a non-aqueous secondary battery with a high capacity excellent in durability can be provided. The above-mentioned lithium-containing complex oxide contains Mn, which is rich in resource and less expensive, as one of main components. Therefore, such an oxide is suitable for mass-production, and can contribute to the reduction in cost.

The invention claimed is:

1. A non-aqueous secondary battery comprising a positive electrode containing a lithium-containing complex oxide having a layered crystal structure as a positive active material, a negative electrode, and a non-aqueous electrolyte,
wherein the lithium-containing complex oxide has a composition represented by General Formula:
$Li_{1+x+\alpha}Ni_{(1-x-y+\delta)/2}Mn_{(1-x-y-\delta)/2}M_yO_2$
(where $0 \leq x \leq 0.05$, $-0.05 \leq x+\alpha \leq 0.05$, $0 \leq y \leq 0.4$, $-0.1 \leq \delta \leq 0.1$; M is Co, or Co and at least one element selected from the group consisting of Ti, Cr, Fe, Cu, Zn, Al, Ge and Sn), and an average valence of Mn is 3.3 to 4.

2. A non-aqueous secondary battery according to claim 1, wherein a molar ratio between Ni and Mn contained in the lithium-containing complex oxide is 1:1.

3. A non-aqueous secondary battery according to claim 1, wherein a true density of the lithium-containing complex oxide is in a range of 4.55 to 4.95 g/cm³.

4. A non-aqueous secondary battery according to claim 3, wherein a true density of the lithium-containing complex oxide is 4.7 g/cm³ or more.

5. A non-aqueous secondary battery according to claim 1, wherein $0 < y \leq 0.2$ in the General Formula.

6. A non-aqueous secondary battery according to claim 1, wherein $0.2 < y \leq 0.4$ in the General Formula.

7. A non-aqueous secondary battery according to claim 6, wherein a molar ratio among Ni, Mn and an element M contained in the lithium-containing complex oxide is 1:1:1.

8. A non-aqueous secondary battery according to claim 1, wherein $-0.015 \leq x+\alpha \leq 0.015$ in the General Formula.

9. A non-aqueous secondary battery according to claim 1, wherein $x = 0$ in the General Formula.

10. A non-aqueous secondary battery according to claim 1, wherein M is Co, or Co and Al in the General Formula.

11. A non-aqueous secondary battery according to claim 7, wherein the lithium-containing complex oxide has a composition represented by General Formula:

$Li_{1+\alpha}Ni_{1/3}Mn_{1/3}Co_{1/3}O_2$ (where $-0.05 \leq \alpha \leq 0.05$).

12. A non-aqueous secondary battery according to claim 1, wherein an average valence of Mn contained in the lithium-containing complex oxide is 4.

13. A non-aqueous secondary battery according to claim 12, wherein an average valence of Ni contained in the lithium-containing complex oxide is about 2.

14. A non-aqueous secondary battery according to claim 1, wherein the positive electrode further contains a positive active material different from the lithium-containing complex oxide having the composition represented by the General Formula.

15. A non-aqueous secondary battery according to claim 14, wherein the positive electrode further contains a lithium-containing cobalt oxide.

16. A non-aqueous secondary battery according to claim 15, wherein a ratio of the lithium-containing cobalt oxide is 50% by mass or less based on a total amount of the positive active materials.

17. A non-aqueous secondary battery according to claim 14, wherein an average valence of Mn contained in the lithium-containing complex oxide is 4.

18. A non-aqueous secondary battery according to claim 17, wherein an average valence of Ni contained in the lithium-containing complex oxide is about 2.

19. A non-aqueous secondary battery according to claim 1, wherein the non-aqueous electrolyte contains, as an organic solvent, at least one kind of chain carbonate selected from dimethyl carbonate, diethyl carbonate, and ethyl methyl carbonate.

20. A non-aqueous secondary battery according to claim 19, wherein the non-aqueous electrolyte further contains, as an organic solvent, an ester with a cyclic structure in an amount of 10% by volume or more based on a total amount of the organic solvent.

21. A non-aqueous secondary battery according to claim 20, wherein the ester with a cyclic structure is at least one selected from ethylene carbonate, propylene carbonate, butylene carbonate, vinylene carbonate, γ-butylolactone, and ethylene glycol sulfite.

22. A non-aqueous secondary battery according to claim 1, wherein a separator having a thickness of 5 to 20 μm is placed between the positive electrode and the negative electrode.

23. A non-aqueous secondary battery according to claim 1, wherein a mass ratio between the positive active material and a negative active material contained in the negative electrode ((mass of the positive active material)/(mass of the negative active material)) is 1.5 to 3.5.

24. A non-aqueous secondary battery according to claim 1, wherein the negative electrode contains, as a negative active material, at least one selected from the group consisting of an element capable of forming an alloy with lithium selected from Si, Sn, In, Ga, and Mg, an alloy containing the element capable of forming an alloy with lithium as a main component, an Sn oxide, a Si oxide, a carbon material, and a complex obtained by combining a plurality of the materials.

25. A non-aqueous secondary battery according to claim 24, wherein the negative active material is at least one selected from an element capable of forming an alloy with the lithium, an alloy containing an element capable of forming an alloy with lithium as a main component, and a complex of the materials and a carbon material.

26. A non-aqueous secondary battery according to claim 25, wherein a mass ratio between the positive active material and the negative active material ((mass of the positive active material)/(mass of the negative active material)) is 4 to 7.

27. A non-aqueous secondary battery comprising a positive electrode containing a lithium-containing complex oxide having a layered crystal structure as a positive active material, a negative electrode, and a non-aqueous electrolyte,
wherein the lithium-containing complex oxide has a composition represented by General Formula:

$LiNi_{1/3}Mn_{1/3}M_{1/3}O_2$ (where M is at least one element selected from the group consisting of Ti, Cr, Fe, Co, Cu, Zn, Al, Ge, and Sn), or a composition in a vicinity thereof, and an average valence of Mn is about 4, and an average valence of Ni is about 2.

28. A non-aqueous secondary battery comprising a positive electrode containing a lithium-containing complex oxide having a layered crystal structure as a positive active material, a negative electrode, and a non-aqueous electrolyte,
wherein the lithium-containing complex oxide has a composition represented by General Formula:

$Li_{1+x+\alpha}Ni_{(1-x-y+\delta)/2}Mn_{(1-x-y-\delta)/2}M_yO_2$ (where $0 \leq x \leq 0.05$, $-0.05 \leq x+\alpha \leq 0.05$, $0 \leq y \leq 0.4$, $-0.1 \leq \delta \leq 0.1$; M is Co, or Co and at least one element selected from the group consisting of Ti, Cr, Fe, Cu, Zn, Al, Ge and Sn), and a true density there of is 4.7 to 4.95 g/cm³, and the positive electrode further contains a lithium-containing cobalt oxide together with the lithium-containing complex oxide.

29. A non-aqueous secondary battery according to claim 28, wherein $0.2 < y \leq 0.4$ in the General Formula.

30. A non-aqueous secondary battery comprising a positive electrode containing a lithium-containing complex oxide having a layered crystal structure as a positive active material, a negative electrode, and a non-aqueous electrolyte,
wherein the lithium-containing complex oxide has a composition represented by General Formula:

$Li_{1+x+\alpha}Ni_{(1-x-y+\delta)/2}Mn_{(1-x-y-\delta)/2}M_yO_2$ (where $0 \leq x \leq 0.05$, $-0.05 \leq x+\alpha \leq 0.05$, $0 \leq y \leq 0.4$, $-0.24 \leq \delta \leq 0.24$; M is Co, or Co and at least one element selected from the group consisting of Ti, Cr, Fe, Cu, Zn, Al, Ge and Sn), and an average valence of Mn is 3.3 to 4.

31. A non-aqueous secondary battery according to claim 27, wherein M is Co, or Co and Al in the General Formula.

32. A non-aqueous secondary battery according to claim 27, wherein the positive electrode further contains a positive active material different from the lithium-containing complex oxide having the composition represented by the General Formula.

33. A non-aqueous secondary battery comprising a positive electrode containing a lithium-containing complex oxide having a layered crystal structure as a positive active material, a negative electrode, and a non-aqueous electrolyte,
wherein the lithium-containing complex oxide has a composition represented by the General Formula:

$LiNi_{1/3}Mn_{1/3}M_{1/3}O_2$ (where M is at least one element selected from the group consisting of Ti, Cr, Fe, Co, Cu, Zn, Al, Ge, and Sn), or a composition in a vicinity thereof, and the positive electrode further contains a lithium-containing cobalt oxide together with the lithium-containing complex oxide.

34. A non-aqueous secondary battery according to claim 33, wherein a ratio of the lithium-containing cobalt oxide is 50% by mass or less based on a total amount of the positive active materials.

35. A non-aqueous secondary battery according to claim 33, wherein M contains at least Co in the General Formula.

* * * * *